July 19, 1932.   L. A. SAFFORD ET AL   1,867,988
COMBINED DUST COLLECTOR AND SHUT-OFF VALVE
Filed July 28, 1931
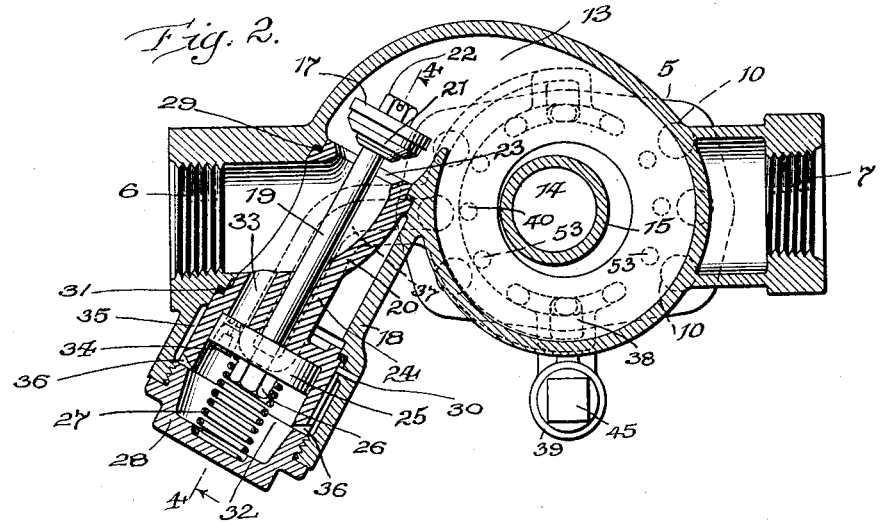
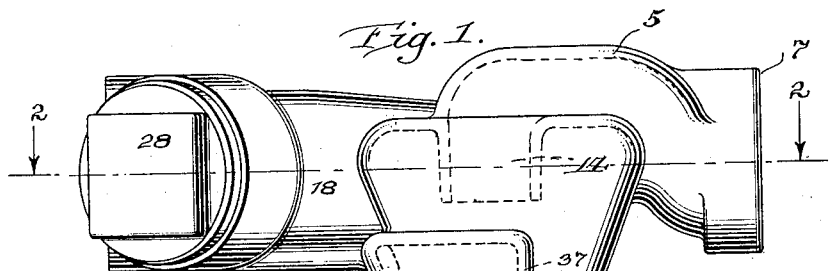
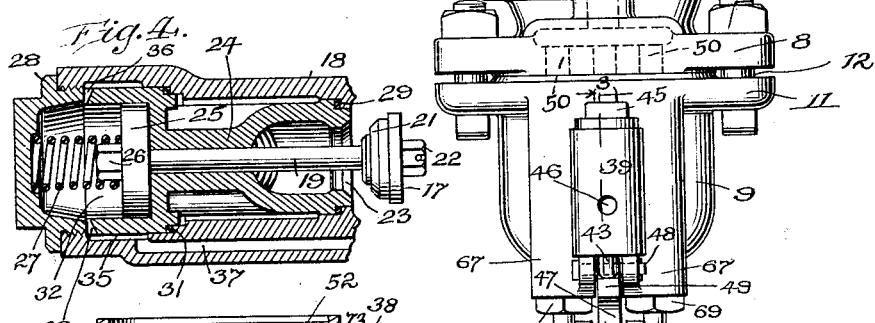
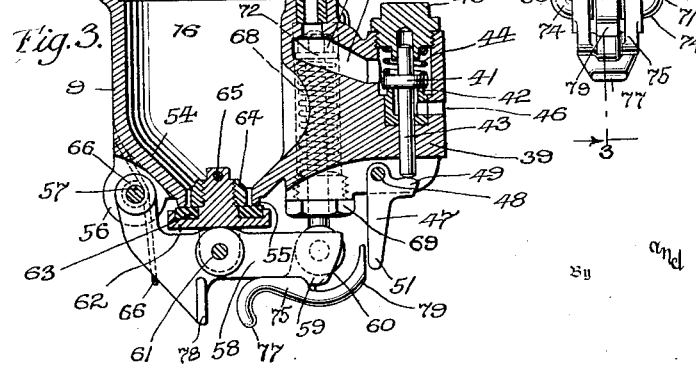
Inventors
Lewis A. Safford
and Walter D. Tyler
Attorneys Patented July 19, 1932

1,867,988

UNITED STATES PATENT OFFICE

LEWIS A. SAFFORD AND WALTER D. TYLER, OF WATERTOWN, NEW YORK, ASSIGNORS TO THE NEW YORK AIR BRAKE COMPANY, A CORPORATION OF NEW JERSEY

COMBINED DUST COLLECTOR AND SHUT-OFF VALVE

Application filed July 28, 1931. Serial No. 553,670.

This invention relates to air brakes and particularly to means for discharging dust and moisture from the piping system without causing excessive losses of pressure fluid.

In the usual railway car brake equipment there is a brake pipe extending throughout the length of each car and a branch pipe leading from the brake pipe to the triple valve, or equivalent device, for controlling the charging of the reservoirs, the admission of reservoir air to the brake cylinders, and the release of pressure from the brake cylinders.

The branch pipe of each car is customarily provided with a stop cock, or equivalent device, for cutting out the brake equipment on that car in case of necessity. Interposed in the branch line is an air cleaning device and the usual practice is to place this between the stop cock and the triple valve. The air cleaning device herein shown by way of example is of the vortex type frequently used in the air brake art to arrest dust and moisture droplets from the train pipe air, and generally called a dust collector.

When the dust collector is to be opened for the removal of its contents, it is necessary that the branch pipe be closed off from the brake pipe, to prevent air from being vented from the brake pipe, thereby causing an undesirable brake application extending beyond the car which is being inspected.

The present invention provides means for rapidly discharging dust and moisture from the dust collector without bleeding pressure fluid from the brake pipe, the parts being so arranged that the manipulation of a single device suffices to close the shut-off valve and to release the discharge valve thereby allowing the pressure trapped in the branch pipe to discharge the dust and moisture from the collector. Movement of the device in a closing direction likewise closes the discharge valve of the dust collector, and opens the shut-off valve to reestablish communication between the brake pipe and the branch pipe.

The preferred embodiment of the invention is illustrated in the accompanying drawing, in which,—

Fig. 1 is a view in elevation of one form of apparatus embodying this invention.

Fig. 2 is a section of the device on the line 2—2 of Fig. 1, with the shut-off valve in open position.

Fig. 3 is a section on the line 3—3 of Fig. 1, showing the exhaust valve, the chambers communicating therewith, and the discharge valve for the collector.

Fig. 4 is a section on the line 4—4 of Fig. 2 showing the passageways in the shut-off valve casing.

Referring to Figs. 1 and 2, the reference character 5 designates a body casting having a threaded inlet connection 6 and a threaded outlet connection 7. The body 5 has a bolting flange 8 adapted to cooperate with the flange 11 of a bottom casting 9, the two flanges being provided with a plurality of openings 10 permitting them to be secured together by bolts 12, and in any one of three angular positions.

The casting 5 contains a chamber 13 which serves as a communication between the inlet 6 and the outlet 7, the passage between this chamber and the outlet being restricted through an upflow passage 14 in tubular body 15. This arrangement is preferably such that air which enters chamber 13 is directed tangentially in the chamber around passage 14, thereby causing dust and moisture to be separated from the air, and directed downwardly. The bottom of chamber 13, below the passage 14, is in restricted communication with a dust chamber 16 wherein the separated dust and moisture are collected.

The passage between inlet connection 6 and chamber 13 is controlled by a shut-off valve 17. This valve is carried in an angular extension 18 of body casting 5, and comprises a tapered valve head 21 cooperating with a valve seat 23 on the inside of a cage 20. The head 21 is carried on a valve stem 19 and secured thereto by a nut 22, the stem 19 being movable in a guide 24 inside of cage 20. The end of stem 19, remote from the seat 23 carries a piston 25 rigidly secured thereto by nut 26, and engaged by a spring 27 which reacts against the inside of a cap 28 which closes the end of angular extension 18.

It will be understood that when a device of this character is connected in the branch pipe of the car equipment, as pointed out above, the inlet 6 will be in communication with the brake pipe and will be subjected to brake pipe pressure, while outlet connection 7 will be connected with the triple valve or equivalent device.

When the shut-off valve occupies the position shown in Fig. 2, fluid pressure may pass freely between the inlet connection 6 and chamber 13, the valve being held in the open position by the spring 27. The cage 20 is sealed with respect to the extension 18 by gaskets 29 and 31, and is held in proper position by a dowel pin 30. The cage 20 is so positioned in the extension 18 as to form a chamber 32 on one side of piston 25, this chamber being formed partly by cap 28 and partly by the cylinder portion of cage 20. A passage 33 formed in cage 20 provides communication between the inlet connection 6 and chamber 32 by way of a choke plug 34 carried by piston 25. The cage 20 is so mounted within extension 18 as to form an annular chamber 35 between the inner wall of the extension and the outer wall of the cage, and this chamber communicates with chamber 32 through constructions formed by notches 36 in the end of cage 20.

The chamber 35 is in communication with a passage 37 formed in the extension 18 and extending to a chamber 38 formed in extension 39 on the bottom casting 9. The union between passageway 37 and the chamber 38 is completed by any one of three ports 50 in bottom flange 8 of casting 5, being placed in registry with a bushing 52 in body 9. The flange 11 carries a dowel pin 40 which is adapted to enter any one of a plurality of dowel pin holes 53 formed in the bottom of flange 8. It will be seen from Fig. 1 that casting 9 may be adjusted angularly with respect to casting 5 while still obtaining registry between bushing 52 and one of the ports 50.

The purpose of the passage 37 is to provide communication between the chamber 32 adjacent piston 25, and an exhaust valve 41 in extension 39. The exhaust valve 41 cooperates with a valve seat 42 and is carried on a valve stem 43, the valve being biased to its closed position by a spring 44 reacting between the valve body and a closure cap 45. This valve controls the communication between the chamber 38 in the extension 39, and a vent 46 also formed in this extension.

Pivotally mounted on the bottom of extension 39 is a bellcrank lever 47 fulcrumed at 48, and having two arms 49 and 51. The arm 49 is adapted to react against the end of stem 43 so as to lift the exhaust valve 41 when the arm 51 is swung to the right by mechanism to be described.

The casting 9 containing chamber 16 is tapered at its lower extremity, as at 54, and terminates in a central discharge port at the bottom of chamber 16, this discharge port being encircled by a valve seat or bead 55.

The casting 9 also carries two spaced depending lugs 56 to which is pivoted by a pin 57, a lever 58 which underlies the valve seat 55 and terminates at its free end on its lower side in an extended boss 59, into which merges an inclined surface 60 on the extreme end of the lever. Pivoted at 61 to the lever 58 is a downwardly opening poppet or discharge valve 62, and this valve is formed with a recess to receive a sealing or packing ring 63 which cooperates with bead 55, when the valve is closed. The ring 63 is held in place by a nut 64 and a cotter pin 65. Coiled around the pivot pin 57 and engaging the lugs 56 is a double coiled spring 66. This spring is relatively weak and exerts a force which is slightly more than sufficient to close the valve 62 against its seat, thus positioning the lever 58 for locking engagement of the cam mechanism, which is later to be described.

Formed in the casting 9, on the side opposite to the lugs 56, are two parallel spring barrels 67 which house coiled compression springs 68 held in position by plugs 69. These plugs which are screwed into the barrels, serve both as supports for the lower ends of the springs 68 and as guides for plunger rods 71. The rods 71 carry at their upper ends washers 72 and nuts 73, the washers engaging the upper ends of the springs 68 so as to draw the plunger rods upward. The total strength of the two springs 68 when applied to the lever 58, is slightly more than sufficient to hold the gasket 63 seated against the bead 55 when chamber 16 is subjected to maximum brake pipe pressure.

The lower ends of rods 71 are bent inwardly at 74 and serve as a fulcrum for a bifurcated cam member 75, which member straddles the end of lever 58. Integrally formed with this cam member 75 is a trigger 77 carrying an extension 79 adapted to cooperate with the arm 51 of bellcrank 47 when the trigger is moved downwardly and to the right from the position shown. The lever 58 is provided with wings or lugs 78 on its lower portion so as to shield and protect the trigger 77 from flying stones, thereby preventing accidental release of pressure fluid from the piping system.

Under normal operating conditions the shut-off valve occupies the position shown in Fig. 2, thereby affording free communication for pressure fluid between inlet connection 6 and outlet connection 7. Under these conditions pressure fluid passes from connection 6 through passageway 33 and choke plug 34 into chamber 32, thence through constrictions 36 and chamber 35 into passageway 37 and thence to chamber 38. When the pressure built up in chamber 32 equals that on the upper side of piston 25, spring 27 moves the piston to the position shown, wherein the shut-off valve is open.

When it is desired to discharge dust and moisture from chamber 16, the trigger 77 is pulled to the right, thereby first causing the extension 79 to engage arm 51 to move exhaust valve 41 to open position, thereby venting chamber 38 to atmosphere through vent 46. Pressure thereupon escapes from chamber 32 through constrictions 36, chamber 35, passage 37, chamber 38 and thence to atmosphere. The pressure in chamber 32 thereupon falls and the pressure exerted on the top side of piston 25 through passageway 33 moves the valve 17 to its closed position. This closes off inlet 6 from chamber 13. The valve retains this position so long as the exhaust valve 41 is open, because pressure can not build up in chamber 32.

Upon further movement of trigger 77, the inclined surface 60 of lever 58 rides over the cam surface of member 75 until the parts are abruptly disengaged. Inasmuch as the chamber 16 is subjected to branch pipe pressure and the shut-off valve 17 is closed, this pressure will blow the valve 62 open as soon as the lever 58 is released. This opening takes place suddenly, thereby blowing out all dust and moisture from chamber 16. Since the shut-off valve is closed, pressure can not build up in chamber 16, hence the valve 62 will close under the action of spring 66 after a short interval, thereby positioning it to be locked shut. When, subsequently, the trigger 77 is moved to the left (Fig. 3) the extension 79 disengages arm 51, thereby allowing the exhaust valve 41 to close under the action of spring 44, and causing pressure to build up in chamber 32. When the pressure in chamber 32 is the same as that in the inlet connection 6, the spring 27 moves the piston upwardly to open the shut-off valve again and supply pressure to the branch pipe through chamber 13.

This movement of trigger 77 to the left causes cam member 75 to engage the cam surface 60 of lever 58 and then to ride over the boss 59 and to lock the valve 62 in its closed position.

It will be evident that this apparatus provides a structure wherein the manipulation of a single member is sufficient to open or close a shut-off valve, and in properly timed sequence to open or close the dust collector. This arrangement positively precludes an emergency application of the brakes throughout the train by failure to close a stop cock in the branch pipe of the car which is being inspected. It provides not only for quick and positive cleaning of the dust collector, but it avoids delays which have been frequent when using devices of the prior art, and in which excessive bleeding of the train pipe could occur in case of failure to close a stop cock before operating the discharge valve.

While the embodiment illustrated has demonstrated utility in practice, it will be recognized that modified forms of apparatus can be devised to accomplish the same result, and no necessary limitation to the particular structure illustrated is implied.

What is claimed is:

1. In an air brake system, an air cleaning device; fluid pressure operated means for controlling the supply of air to said device; a manually controlled discharge valve for said device; and means for causing said fluid pressure operated means to operate in definitely timed relation to the discharge valve.

2. In an air brake system, the combination with a brake pipe subject to air pressure, of an air cleaning device; fluid pressure operated means for controlling the supply of air from said brake pipe to said device; manually operated means for controlling the opening and closing of said device; and a valve operatively connected with said manually operated means for controlling the operation of said fluid pressure operated means.

3. In an air brake system, a dust collector; a manually operable discharge valve for said collector; a fluid pressure operated valve for controlling the supply of air to said collector; and an exhaust valve mechanically connected to said discharge valve operating means.

4. In an air brake system, a dust collector; a manually operable discharge valve for said collector; fluid pressure operated means for controlling the supply of air to said collector; and means operatively connected to the discharge valve operating means for controlling the operation of said fluid pressure operated means.

5. In an air brake system, a dust collector having a discharge valve; a fluid pressure operated valve for controlling the supply of fluid to said collector; manually operable means for locking and unlocking the discharge valve; an exhaust valve for controlling the operation of said fluid pressure operated valve; and an operative connection between said manually operable means and said exhaust valve.

6. In an air brake system, a train pipe subject to fluid pressure; a dust collecting device connected to said pipe; a shut-off valve for controlling the connection between said pipe and said device; a piston for operating said shut-off valve; a discharge valve for said collecting device; manually operable means for locking and unlocking said discharge valve; an exhaust valve for releasing pressure from one side of said piston to cause movement of the shut-off valve; and means for causing said discharge and exhaust valves to operate in timed sequence.

7. In an air brake system, a train pipe subject to fluid pressure; a dust collecting device connected to said pipe; a shut-off valve between said pipe and said device; a piston connected to said valve; a chamber; a choke plug in said piston for admitting pressure fluid from said pipe to said chamber to cause movement of said shut-off valve in one direction; a discharge valve for said device; manually operable means for locking and unlocking said discharge valve; an exhaust valve for controlling the escape of fluid from said chamber to operate said shut-off valve in the other direction; and a mechanical connection between said exhaust valve and said manually operable means.

8. In an air brake system, an air cleaning device; a stop valve for controlling the supply of air to said device; a piston for operating said valve, said piston being subject to opposing pressures; means for holding said valve open when the opposing pressures are equalized; and a valve for destroying such equalization to close said valve.

In testimony whereof we have signed our names to this specification.

LEWIS A. SAFFORD.
WALTER D. TYLER.